United States Patent [19]

Taylor

[11] Patent Number: 5,311,898
[45] Date of Patent: May 17, 1994

[54] DASHPOT DAMPENED HIGH PRESSURE FLUID SHUTOFF VALVE

[76] Inventor: Julian S. Taylor, 8300 SW. 8th, Oklahoma City, Okla. 73128

[21] Appl. No.: 126,863

[22] Filed: Sep. 27, 1993

[51] Int. Cl.⁵ .............................................. F16K 17/00
[52] U.S. Cl. ........................................ 137/67; 251/48
[58] Field of Search ............................ 137/67; 251/48

[56] References Cited

U.S. PATENT DOCUMENTS 3,335,998  8/1967  Heing ................................ 251/48 X
5,067,511  11/1991  Taylor ................................ 137/67

*Primary Examiner*—John C. Fox
*Attorney, Agent, or Firm*—Robert K. Rhea

[57] ABSTRACT

A fluid closing action dampened shutoff valve for closing a high pressure fluid conductor is formed by a valve body interposed in a high pressure fluid conductor. The valve body contains a valve seat and a normally open valve for seating on the seat and interrupting fluid flow through the valve body in response to fluid pressure above a predetermined value in the conductor. The valve includes a stem slidably supported by and projecting, at one end portion, outwardly of the body. An end plate is secured to the body by posts in axially spaced relation with respect to the valve stem and axially supports a dashpot on the valve stem and a pressure collapsible rod-like pin axially interposed between the dashpot and the end plate.

6 Claims, 2 Drawing Sheets

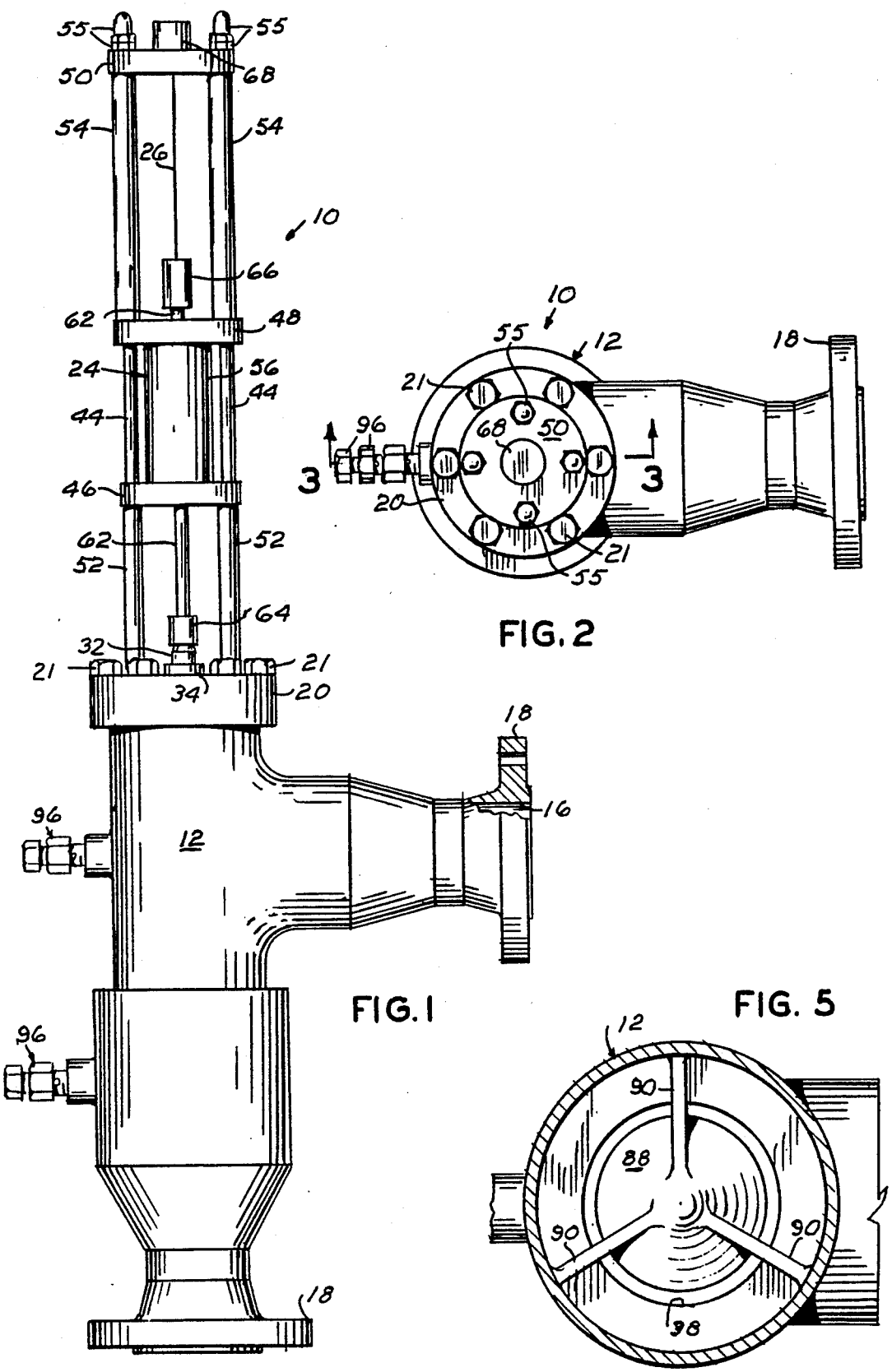

DASHPOT DAMPENED HIGH PRESSURE FLUID SHUTOFF VALVE

BACKGROUND OF THE INVENTION

This invention relates to control of fluid in relatively high pressure fluid conducting lines and more particularly to a cushioned closing action shutoff valve.

1. Field of the Invention

A globe or single seat type valve interposed in a relatively high pressure fluid conducting pipe line, when moved to a closed position by high pressure fluid collapsing a pressure responsive pin the valve in the globe or single seat type valve moves from a fluid passageway fully open position to a completely closed fluid passageway position in milliseconds.

If the fluid in the line is a gas this presents no problem, however, if the fluid is a liquid this sudden flow stoppage of fluid in a line of several miles in length creates tremendous pressure in the pipeline which may equal twice the pressure which caused the valve to close in the first place. This excessive pressure as a result of a globe or single seat type valve closing quickly is highly undesirable.

This invention solves this problem by dampening the movement of the valve toward its seat in a closing action.

2. Description of the Prior Art

The most pertinent patents are believed to be my U.S. Pat. No. 5,067,511 issued Nov. 26, 1991 for HIGH PRESSURE FLUID EMERGENCY SHUTDOWN VALVE.

This patent features a valve body connected with a fluid conductor in which a valve moved toward its seat by fluid pressure includes an elongated valve stem projecting through a valve bonnet to collapse a pin due to fluid pressure on the unbalanced valve stem area referenced to atmospheric pressure giving an axial force to buckle the restraining pin for permitting the valve to close with its seat and stop fluid flow through the valve body.

This invention provides a valve body similarly having a valve fluid pressure moved toward its seat in which the valve has an elongated stem connected with a dashpot which cushions valve impact on its seat in response to high pressure fluid collapsing a pin and moving the valve to close with its seat.

SUMMARY OF THE INVENTION

A valve body having an inlet port and a lateral outlet port is adapted to be interposed in a high pressure fluid conducting line. The inlet port contains a valve having an elongated stem projecting axially through the valve body opposite its inlet port for guiding the valve toward a valve seat adjacent the inlet port for closing the fluid passageway.

The outwardly projecting end of the valve stem is axially connected with the piston rod of a tubular dashpot axially connected with the valve body opposite its inlet port by a cage means. The cage means comprises a plurality of elongated rod-like members disposed in circumferential equally spaced radially outward relation from the valve stem and the dashpot and terminates in a collapsible pin cage supporting a collapsible pin collapsed by fluid pressure against the valve, moving the valve to close with its seat.

This principal object of this invention is to provide a high pressure fluid shutoff valve adapted to be interposed in a high fluid pressure line in which a valve moving toward its seat to close the fluid passageway is dampened in its movement B by a dashpot connected with the valve stem end portion projecting outwardly of the valve body.

BRIEF DESCRIPTION OF THE DRAWINGS

FIG. 1 is a side elevational view of the valve assembly;

FIG. 2 is a top view;

DESCRIPTION OF THE PREFERRED EMBODIMENTS

Figure 3A:
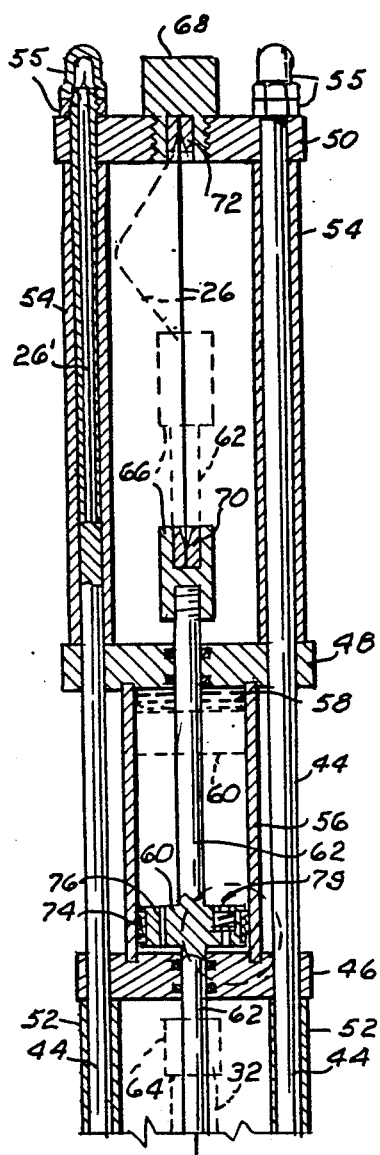
FIGS. 3A and 3B are fragmentary vertical cross sectional views, to a larger scale, taken substantially along the line 3—3 of FIG. 2.
Figure 3B:
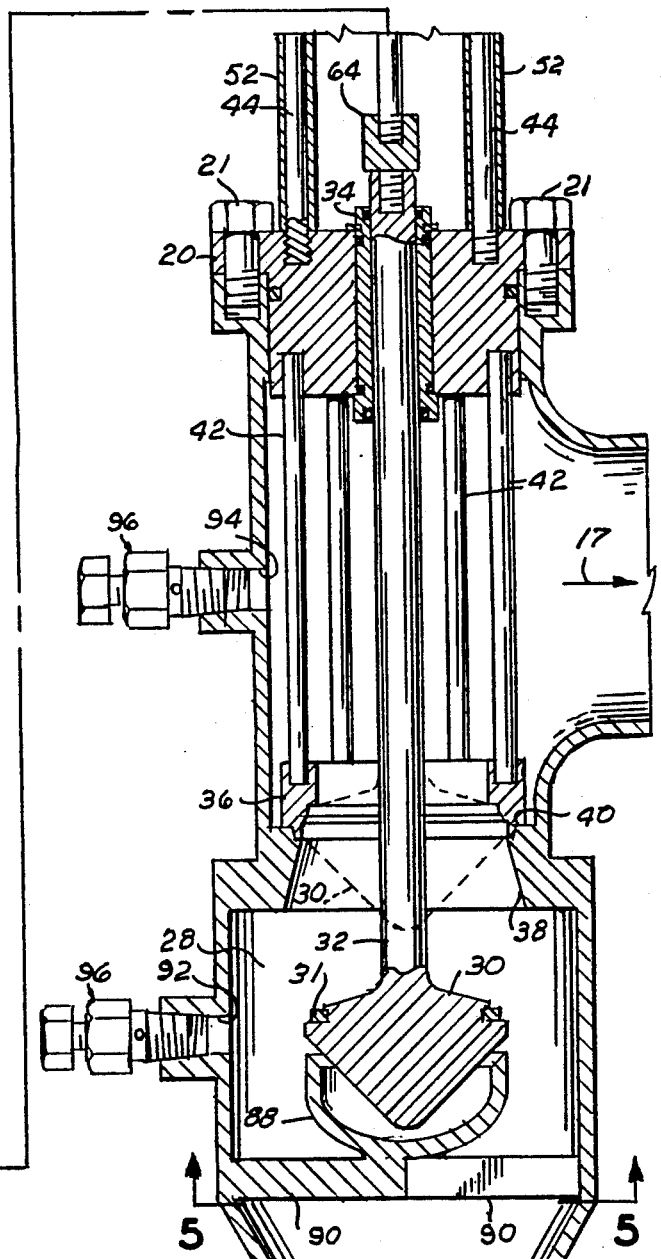

Like characters of reference designate like parts in those figures of the drawings in which they occur.

In the drawings:

The reference numeral 10 indicates the valve, as a whole, having a body 12 provided with an inlet port 14 and a lateral outlet port 16, forming a fluid passageway 17. The ports are each provided with conventional bolt flanges 18, adapted to be interposed in a high pressure fluid conductor and connected with cooperating flanges, not shown.

Opposite its inlet port, the valve body is provided with another wall opening 19 closed by a cap 20 and bolts 21 which supports a cage mean 22, in turn, supporting a dashpot 24 and collapsible pin 26 in axial alignment with the inlet port 14.

The valve body is diametrically enlarged downstream from its inlet 14 to form an inlet chamber 28 loosely surrounding a valve 30 having an annular crush metal seal 31 and a valve stem 32 slidably projecting axially through the valve cap 20 in a sleeve bushing 34, secured to the cap 20, for guiding the valve 30 toward and away from a valve seat 36.

At the inward limit of the inlet chamber 28, the valve body wall is provided with a tapered downstream converging surface 38 defining a downstream facing annular shoulder 40 at the downstream limit of the converging wall 38.

The valve seat 36 axially abuts by the annular shoulder 40 and is held in place by a plurality (6) of rods 42 interposed between the valve seat 36 and the body wall cap 20 in circumferential equally spaced relation.

The pin cage means 22 comprises a plurality (4) of bolts 44 threadedly connected at one end portion, in circumferential equally spaced relation, to the cap 20 radially outward of the outwardly projecting end portion of the valve stem 32. The bolts 44 project through cooperating apertures formed in end plates 46 and 48 of the dashpot 24 and a pin support plate 50.

A similar plurality of tubular sleeves 52 and 54 of selected length are respectively interposed between the valve body cap 20 and dashpot end plate 46 and between the other end plate 48 of the dashpot and the pin end plate 50. Lock and acorn nuts 55 are connected with the end portions of the bolts 44 opposite the valve body for maintaining the cage means 22 rigidly secured to the valve body cap 20.

The dashpot 24 is characterized by a sleeve body 56 extending axially between its end walls 46 and 48 and rigidly secured thereto for containing a quantity of fluid, such as oil 58. The dashpot includes a piston 60 normally disposed adjacent its end wall 46 and having one end portion of its through piston rod 62 axially connected with the valve stem 32 by a coupling 64.

Similarly, another coupling 66 is axially connected with the other end portion of the dashpot piston rod 62 projecting beyond its end wall 48 and axially supporting one end of the collapsible pin 26. The other end portion of the pin 26 is supported by an end plate plug 68 axially threadedly connected with the pin plate 50.

Axial bushings 70 and 72 within the coupling 66 and plug 68, respectively, support the end portions of the collapsible pin 26.

Figure 4:
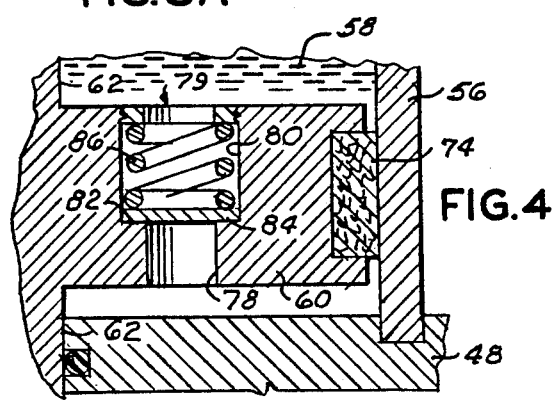
FIG. 4 is a fragmentary vertical cross sectional view, to a further enlarged scale of the area enclosed by the broken line circle in FIG. 3A; and, FIG. 5 is a horizontal sectional view taken substantially along the line 5—5 of FIG. 3B.

The dashpot piston 60 is provided with an annular seal 74 for sealing with the inner wall surface of its sleeve body 56. The dashpot piston is provided with a relatively small diameter eccentric bore 76 for bypassing oil through the piston in response to an axial force applied to the piston rod end portion connected with the valve 30. The dashpot piston 60 is provided with a second offset bore 78 (FIG. 4), normally closed by a check valve 79 and counterbored, as at 80, to form an annular shoulder 82. A disc valve 84 is normally impinged on the shoulder 82, for closing the bore 78, by a spring 86. The purpose of the offset bore 78 and check valve 79 is to quickly bypass the oil 58 through the piston while resetting the valve 10 after the collapse of the pin 26, as presently explained.

The upstream surface of the valve head 30 is loosely shielded by a cup-like socket 88 supported by a plurality (3) 120° spaced arms 90 secured to the valve body inner wall surface.

The valve body is further provided with fluid access ports 92 and 94 on the upstream and downstream side of the valve seat 36 and normally closed by needle valve plugs 96.

OPERATION

Operation of the valve seems obvious, but briefly stated, when high pressure fluid collapses the pin 26 fluid pressure moves the valve 30 toward its seat 36 wherein the dashpot oil 58 must pass through the piston eccentric bore 76, thus, delaying the time for movement of the valve sealing fluid tight with the seat 36.

The valve 10 may be reset by manually removing the end plate plug 68 and the collapsed pin 26. A new pin 26' contained by each of the posts 44 is accessed by removing one of the acorn nuts 55 and the new pin 26' is placed in the coupling and plug bushings 70 and 72 with the plug being threadedly reconnected with the end plate 50.

Obviously the invention is susceptible to changes or alterations without defeating its practicability. Therefore, I do not wish to be confined to the preferred embodiment shown in the drawings and described herein.

I claim:

1. A high pressure fluid flow emergency shutoff valve, comprising:

a valve body having an inlet port and an outlet port forming a fluid passageway interposed in the flow line;

a valve seat intersecting the fluid passageway;

normally open valve means including a valve stem slidably supported by said body for movement of the valve means toward said valve seat and closing the fluid passageway;

axially collapsible pin means including a pin supported by said body in axial alignment with the valve stem for normally biasing said valve means toward a fluid passageway open position and releasing said valve means for seating on said valve seat in response to a predetermined value of fluid pressure in the fluid passageway; and, valve movement dampening means including a dashpot interposed between said valve stem and said pin means.

2. The shutoff valve according to claim 1 in which said valve means further includes:

a valve head on said valve stem for seating on said seat, said valve stem having an end portion projecting outwardly of said valve body.

3. The shutoff valve according to claim 2 in which said pin means further includes:

pin cage means including an end plate secured to said body in axial outstanding relation with respect to the outwardly projecting end portion of the valve stem; and, an elongated rod-like pin axially extending between said dashpot and the end plate.

4. The shutoff valve according to claim 3 in which said pin cage means further includes:

a plurality of posts surrounding said pin in radially spaced relation for connecting said end plate with the valve body.

5. The shutoff valve according to claim 1 in which the dashpot dampening means includes:

a dashpot body containing a quantity of fluid and having opposing end walls; and, a piston in said dashpot body and having a piston rod axially projecting through the respective said dashpot end wall.

6. The shutoff valve according to claim 5 and further including:

fluid pressure bleed valves connected with said valve body and communicating with the fluid passageway on the upstream and down stream side of the Valve seat, respectively.

* * * * *